Patented June 30, 1953

2,643,983

UNITED STATES PATENT OFFICE 2,643,983

PROCESS FOR PREPARING CURED SHAPED PRODUCTS

Charles Dangelmajer, Nutley, N. J., assignor to Emsig Manufacturing Company, New York, N. Y., a firm No Drawing. Application March 28, 1950, Serial No. 152,490

3 Claims. (Cl. 260—40)

This invention relates to the production of shaped products having integral sheen, from thermosetting plastic materials and it has particular relation to shaped products cast or molded from thermosetting unsaturated polyester resin compositions of the type described hereinafter.

The main object of the present invention consists in the production from thermosetting resinous plastic materials of shaped articles having integral sheen, by a process which is simpler than the processes hitherto known, and results in molded or cast articles of improved quality, integral sheen and pleasant appearance.

Another object of my invention consists in the production of articles of the before-mentioned type, of high mechanical strength and marked resistance to elevated temperatures as well as chemical influences.

Further objects and the advantages of the invention will be apparent from the appended claims and the following specification which describes, by way of example, some embodiments of the invention.

Numerous methods of producing integral sheen in plastic materials, such as cellulose nitrate, cellulose acetate and other plastic materials, have been suggested previously, and methods of producing integral sheen in solid plastic materials prepared from polymerizable organic liquids have also been disclosed. According to one of these methods, cast rods having integral sheen are prepared by mixing a polymerizable liquid thermoplastic material, such as methyl methacrylate, with fish scale essence or other light-reflecting material, and a polymerization catalyst, filling the mixture into a metal pipe and subjecting it to progressive polymerization along the longitudinal axis of the pipe. (U. S. Patent No. 2,168,331, Fields et al.). According to another process, cast articles, particularly tubes, having integral sheen are prepared by centrifugal casting in a cylindrical mold from a mixture of thermoplastic polymerizable compounds and light-reflecting lamellae (U. S. Patent No. 2,265,226, Clewell et al.). It was also disclosed that cast thermoplastic resin sheets having integral sheen can be obtained from polymerizable liquids by the application of actinic energy to the cast liquids, or by causing turbulence in the cast liquid (U. S. Patent Nos. 2,480,749, B. M. Marks, 2,480,750, R. E. Leary, 2,480,751, B. M. Marks and 2,480,752, D. C. Rogers). In these known processes the shaped articles are obtained always by casting and the before-mentioned particular steps, such as progressive polymerization along the axis of a tube, centrifugal casting, application of acitinic energy and/or turbulence or the like, are necessary in order to bring about orientation of the light-reflecting lamellae dispersed in the polymerizable liquid.

I have now found that shaped plastic articles having integral sheen are obtained by molding or casting, without the application of particular steps or means for orientation of the light-reflecting lamellae, by proceeding in the following manner.

The starting material used in carrying out my present invention is a liquid, thermosetting, unsaturated polyester resin composition of the type defined hereinafter. This starting material, which is a thermosetting polymerizable liquid, is mixed with a polymerization catalyst and subjected to pre-polymerization up to a condition in which the resin forms a liquid viscous mass which, however, must be still homogeneously miscible with the liquid starting resin or with another liquid polymerizable material which is compatible with and adapted to copolymerize with the thermosetting, unsaturated polyester composition used as my starting material. The ideal end point and upper limit of pre-polymerization according to my invention is the point at which (a) the thermosetting, unsaturated polyester resin has the highest viscosity in liquid condition before gelling and (b) is still soluble or homogeneously dispersible in the polymerizable starting material and can be homogeneously diluted also with other compatible liquid materials which are capable of being co-polymerized with the starting material.

The degree of polymerization attained in the pre-polymerization step depends (1) on the nature of the starting composition; (2) on the character and amount of the substance or substances used in the resinous composition for accelerating polymerization; (3) on the intensity of heat or other polymerizing factors applied; (4) on the presence or absence of inhibitors and (5) on the duration of the pre-polymerization step. In treating a certain starting material, the operator will select the substance to be used for accelerating the polymerization, and he will determine the amount of this substance as well as the polymerization factor and its intensity, for example in the case of heat polymerization the temperature of the pre-polymerization. These conditions being predetermined, the operator will find out in a few preliminary tests how long heating of a specific resinous composition should be continued under the predetermined conditions in order to attain, or to come sufficiently near to, the above-mentioned ideal end point of pre-polymerization. In other words, a product of integral sheen is also obtained if pre-polymerization has not been carried up to the optimum limit, but only near to it. But the closer the optimum limit is approached, the better the integral sheen will be.

Prior to or after the prepolymerization step, a suitable light-reflecting material, such as fish-scale essence, is introduced into and homogeneously mixed with the resinous composition used as starting material in my invention. Furthermore, to the prepolymerized material a suitable amount of untreated starting material or of a compatible, co-polymerizable material and/or a suitable additional amount of a substance accelerating polymerization may be added, if desired. If necessary, gas bubbles are removed by suction and the composition is now ready for molding or casting. If the resin composition has to be stored after prepolymerization and prior to molding or casting, for a substantial period of time, an inhibitor of polymerization is added, if desired, prior to storing and in this case the additional amount of the accelerator of polymerization is not added to the prepolymerized composition until shortly before molding or casting.

The starting materials used in carrying out my invention are polymerizable, thermosetting liquid compositions. They are obtained by processes which do not form part of my present invention, by reacting (a) polycarboxylic acids, such as maleic acid, fumaric acid, itaconic acid, phthalic acid; (b) polyhydric alcohols or glycols, such as ethylene glycol, diethylene glycol, pentaerythritol. In preparing a thermosetting polyester by condensation of these acids and alcohols, at least one unsaturated compound must be used, which may be one of the acids or one of the hydroxy compounds. Upon polymerization, the unsaturated, thermosetting polyesters thus obtained form cross-linked three-dimensional structures. In addition to the polyester or polyesters, my starting material also contains an unsaturated, polymerizable hydrocarbon containing a $CH_3=C<$ linkage, which serves as a modifier and solvent for the unsaturated polyester and, upon polymerization, forms a co-polymer with the polyester. As examples of such unsaturated hydrocarbons, styrene, which is very frequently used, cyclopentadiene and divinyl benzene may be mentioned. The unsaturated hydrocarbon may be partly or completely substituted by another unsaturated, compatible and co-polymerizable liquid compound containing a $CH_2=C<$ linkage. It is to be understood that my invention is not limited to thermosetting unsaturated polyester resin compositions obtained from the above-mentioned ingredients or to the specific compositions mentioned hereinafter, and may be applied to any polyester resin composition of the composition and character here described.

In carrying out my invention, any suitable polymerization catalyst may be used, such as methylethyl ketone peroxide, benzoyl peroxide, lauroyl peroxide and others. The quantity and quality of the catalyst used in pre-polymerization varies to some extent with the composition and properties of the polyester and the temperature of prepolymerization. From some catalysts, such as methylethyl ketone peroxide, less than 0.1% by weight is sufficient when the temperature of prepolymerization is within the temperature range of 60°–75° C. In order to avoid local overheating, prepolymerization is carried out under continuous mixing but without causing the formation of bubbles, and with close temperature control. However, prepolymerization can be effected also at room temperature by suitable selection of the type and amount of the catalyst and of duration of the polymerization treatment. I prefer to carry out prepolymerization at moderately elevated temperatures, at which the course of polymerization can be easily controlled.

In order to produce integral sheen in the shaped products of my invention, light-reflecting lamellae are added to and homogeneously mixed with the resinous material prior to or after prepolymerization. The preferred light-reflecting material used in my invention is pearl-essence which is prepared according to known methods from fish scales. However, other light-reflecting lamellae such as aluminum-bronze, lead carbonate or lead iodide, may also be used.

Polymerization to the prepolymerized condition and to the hard and infusible condition is carried out in the presence of a polymerization catalyst preferably by heating.

As mentioned above, the prepolymerized material is mixed, if desired, prior to its further treatment with a suitable amount of the starting material or with a compatible polymerizable material which forms a co-polymer with the polyester composition used during the further treatment. Examples of such materials are: esters of acrylic, methacrylic, maleic acid, diallyl phenyl phosphonate, vinyl acetate, acrylonitrile, styrene.

In the following examples, the parts or amounts are by weight if not otherwise stated.

*Example 1.*—To an unsaturated, thermosetting liquid polyester composition obtained by homogeneously mixing 1 part of styrene with 2 parts of a polyester resin formed by condensation of propylene glycol with fumaric acid and phthalic acid anhydride, 0.05% methylethyl ketone peroxide and 0.5% benzoyl peroxide and then 3% of commercial pearl essence were homogeneously admixed. The mixture was heated in a water bath at about 60° C. and agitated continuously but carefully to avoid the formation of gas bubbles. Heating with agitation was continued for about 80–100 minutes. After this time heating was interrupted in order to avoid gelation of the composition and to keep it in a highly viscous condition in which it was still homogeneously miscible with an unchanged portion of the starting composition or with styrene. From the material thus obtained a sheet of $\frac{3}{16}''$ thickness having integral pearly sheen was cast by removing air bubbles by suction and pouring the material between two glass plates separated by a gasket and heating it at 60° C. in order to complete polymerization.

The polyester used in this example was prepared by reacting 6 mols of propylene gylcol, 5 mols of fumaric acid, 1 mol of phthalic acid anhydride at about 180° C.

*Example 2.*—A liquid composition consisting of one part of the polyester resin described in Example 1, and ½ part of styrene was mixed with 0.075% of methylethyl ketone peroxide and 3% of pearl essence. The mixture obtained was heated in a water bath at 65° C. under continuous slow mixing for 45–60 minutes. The viscous liquid, which was still soluble in the starting material, was homogeneously mixed with 0.02% of hydroquinone dissolved in diallyl phthalate to inhibit further polymerization during storage and was then cooled to room temperature, i. e. 15°–20°.

In order to obtain shaped articles, the material was homogeneously mixed with 1% benzoyl peroxide and cast to sheets substantially in the manner and under the conditions described in Example 1. In order to obtain disc shaped button blanks of a thickness of about $\frac{3}{16}''$, a mixture of the stored material with 1% of the benzoyl peroxide catalyst was subjected to molding by simultaneous application of heat and pressure, by compression molding under a pressure of 500 lbs. per square inch for about 3 minutes, the platens of the press being kept at 115° C. The blanks thus obtained showed a beautiful, integral pearly sheen, excellent mechanical properties and high resistance to elevated temperatures and chemicals used in laundering.

*Example 3.*—A liquid, thermosetting composition consisting of a homogeneous mixture of equal parts by weight of dimethallyl maleate, dimethallyl adipate and styrene was homogeneously mixed with 0.1% methylethyl ketone peroxide and heated in a water bath at 60° C. under continuous slow agitation for 80–100 minutes. The heating was then discontinued and the viscous liquid composition mixed with 50 parts of styrene and 3.3% of pearl essence. After cooling to 15°–20° C., 1% of benzoyl peroxide was homogeneously mixed with the composition and production of shaped articles was effected by casting or molding in the manner described in Example 2.

*Example 4.*—A liquid thermosetting composition consisting of 2 parts of the polyester resin described in Example 1 and ½ part of methyl methacrylate and ½ part of styrene is homogeneously mixed with 0.1% methylethyl ketone peroxide and heated in the water bath at about 70° C. for 20 minutes. The viscous liquid thus formed was mixed with $\frac{1}{12}$ of its weight of diallyl phthalate and $\frac{1}{12}$ of its weight of methyl methacrylate and the resulting mixture was homogeneously mixed with 3% pearl essence and 0.6% of benzoyl peroxide. The air bubbles were removed from the mix by the application of reduced air pressure and finally shaped articles were made by molding or casting in the manner described in the preceding examples.

*Example 5.*—A prepolymerized composition was made from the ingredients and in the manner described in the above Example 1. Fifty parts portions of this prepolymerized material were homogeneously mixed with 5 parts of the following materials, respectively: (*a*) styrene; (*b*) methyl methacrylate; (*c*) allyl acetate; (*d*) diallyl phthalate; (*e*) diallyl fumarate; (*f*) diallyl maleate. Each of the mixtures thus obtained was mixed with 0.5% benzoyl peroxide catalyst and 2% of pearl essence and discs were cast and molded from these compositions substantially in the manner described in the preceding examples. Articles of integral sheen, pleasant appearance and outstanding mechanical properties were thus obtained.

*Example 6.*—To a mixture of 70 parts of ethylene glycol polyester of endomethylene tetrahydrophthalic acid with 30 parts of styrene and ¼ part of maleic anhydride 1% of benzoyl peroxide is added and the mixture is subjected to prepolymerization at 75° C. until a viscous but still fluid prepolymerized product is obtained. This product is cooled, mixed with 3% of pearl essence and 1% of benzoyl peroxide and is then cast or molded at 125° C. substantially in the manner described in the preceding examples.

*Example 7.*—The procedure described in the above Example 1 is carried out in an identical manner but with the substitution of (*a*) light-reflecting aluminum bronze lamellae and (*b*) light-reflecting lead carbonate lamellae for the pearl essence.

I have also found that the commercial thermosetting, unsaturated polyester resin compositions marketed under various trade-marks can be used with very satisfactory results according to my invention for obtaining shaped articles having integral sheen.

In carrying out my present invention, the step of prepolymerization of the starting material in the above described manner, i. e. continuing prepolymerization by heating in the presence of a catalyst until the polyester composition comes within the range of maximum viscosity without gelation and without losing the property of being homogeneously miscible with compatible, copolymerizable liquids, is of fundamental importance and indispensable. If in the process of the invention, under otherwise equal conditions, the starting material is mixed with the catalyst and light-reflecting lamellae and is subjected to casting or molding without such prepolymerization, no products having integral sheen can be obtained and the products obtained by such procedure have the appearance of white-like translucent products containing a slight amount of an ordinary white pigment. The term "the range of maximum viscosity without gelation" is used in the appended claims to denote a polymerization condition in which the resinous composition has either substantially reached its maximum viscosity before gelation or is close to it, as explained above in the introductory part of this specification. I have found that production of shaped articles in the above described manner by molding yields products of particularly beautiful sheen and high quality. In casting, the conditions of hardening, particularly the amount and kind of catalyst and the temperature, should be selected so as to effect the necessary gelling in a short time, for example 10–30 minutes.

It will be understood that the specific conditions of casting and molding, such as temperature, pressure, time intervals, etc., depend on the particular conditions of the individual case, such as nature of the resinous composition, kind and amount of the catalyst used, dimensions of the articles to be shaped, etc. However, I have found that as a typical procedure, which may be modified in specific cases, prepolymerization in the presence of the conventional amounts and kinds of catalysts can be carried out at temperatures of 40°–80° C., curing of cast products at temperatures of 30° to 120° C. and molding under heat and pressure at temperatures of 80° to 140° C.

It will be obvious to those skilled in the art that my present invention is not limited to the specific steps, materials and conditions described above and may be carried out with various modifications. For example, catalysts, light-reflecting lamellae, thermosetting unsaturated polyester resin compositions or mixtures thereof, and/or polymerization, casting and/or molding conditions other than those described above, may be used and articles other than sheets or discs and disc-shaped products may be produced. I prefer to produce molded products by the compression molding process described in the co-pending patent application for "Process for Compression Molding Plastic Materials" filed by Joseph Sucher, under Ser. No. 152,492, simultaneously with the present application, but other methods of molding, such as injection molding or extrusion, may also be used. This and other modifications may be made without departing from the spirit of the invention as defined in the appended claims.

What I claim is:

1. A resinous composition for the production by compression molding of shaped and cured products having integral sheen, said composition consisting of a liquid mixture of thermosetting, unsaturated liquid polyester resin with an unsaturated liquid compound having a $CH_2=C<$ linkage and being compatible with said resin, a polymerization catalyst and light-reflecting lamellae, said mixture being in the range of maximum viscosity before gelation, but still homogeneously miscible with non-polymerized starting material.

2. A resinous composition for the production by compression molding of shaped and cured products having integral sheen, said composition consisting of the liquid mixture of a thermosetting, unsaturated liquid polyester resin with an unsaturated liquid compound having a $CH_2=C<$ linkage and being compatible and copolymerizable with said resin, a polymerization catalyst, light-reflecting lamellae and a polymerization inhibitor, said mixture being in the range of maximum viscosity without gelation, but still homogeneously miscible with non-polymerized starting material.

3. An article having integral sheen, consisting of the cured and shaped composition claimed in claim 1.

CHARLES DANGELMAJER.

References Cited in the file of this patent

UNITED STATES PATENTS

| Number | Name | Date |
|---|---|---|
| 2,078,808 | Reardon et al. | Apr. 27, 1937 |
| 2,265,226 | Clewell et al. | Dec. 9, 1941 |
| 2,368,161 | Rubner | Jan. 30, 1945 |
| 2,369,689 | Robie et al. | Feb. 20, 1945 |
| 2,377,095 | Muskat | May 29, 1945 |